US011630609B2

United States Patent
Liu et al.

(10) Patent No.: US 11,630,609 B2
(45) Date of Patent: *Apr. 18, 2023

(54) SCHEDULING ACCESS COMMANDS FOR DATA STORAGE DEVICES

(71) Applicant: Western Digital Technologies, Inc., San Jose, CA (US)

(72) Inventors: Haining Liu, Irvine, CA (US); YungLi Ji, Irvine, CA (US); Yun-Tzuo Lai, Irvine, CA (US); Ming-Yu Tai, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 16/937,420

(22) Filed: Jul. 23, 2020

(65) Prior Publication Data

US 2020/0356312 A1 Nov. 12, 2020

Related U.S. Application Data

(63) Continuation of application No. 15/395,161, filed on Dec. 30, 2016, now Pat. No. 10,740,042.

(51) Int. Cl.
*G06F 3/06* (2006.01)

(52) U.S. Cl.
CPC ............ *G06F 3/0688* (2013.01); *G06F 3/061* (2013.01); *G06F 3/0653* (2013.01); *G06F 3/0659* (2013.01)

(58) Field of Classification Search
CPC .... G06F 3/0659; G06F 3/0653; G06F 3/0688; G06F 3/061; G06F 3/06
See application file for complete search history.

(56) References Cited

U.S. PATENT DOCUMENTS

| 6,711,649 | B1 | 3/2004 | Bachmat et al. |
| 8,775,732 | B1 | 7/2014 | Banerjee |
| 9,274,710 | B1 * | 3/2016 | Oikarinen ............... G06F 13/18 |
| 9,910,861 | B2 | 3/2018 | Marwah et al. |
| 2012/0159052 | A1 | 6/2012 | Lee et al. |
| 2015/0205664 | A1 | 7/2015 | Janik et al. |
| 2016/0162186 | A1 | 6/2016 | Kashyap et al. |
| 2016/0179404 | A1 | 6/2016 | Nanduri et al. |

(Continued)

OTHER PUBLICATIONS

Y. Kang, Y. Kee, E. L. Miller and C. Park, "Enabling cost-effective data processing with smart SSD," 2013 IEEE 29th Symposium on Mass Storage Systems and Technologies (MSST), 2013, pp. 1-12.*

(Continued)

*Primary Examiner* — Pierre Michel Bataille
(74) *Attorney, Agent, or Firm* — Loza & Loza, LLP; Gabriel Fitch (57) ABSTRACT

Systems and methods are disclosed for scheduling access commands for a data storage device. A data storage device determines a layout of a plurality of non-volatile memory arrays. The data storage device also determine completed access statistics and pending access statistics for a first set of the plurality of non-volatile memory arrays during a monitoring period. The data storage device further generates a schedule based on the layout of the plurality of non-volatile memory arrays, the completed access statistics, and the pending access statistics and executes access commands based on schedule.

17 Claims, 7 Drawing Sheets

(56) References Cited

U.S. PATENT DOCUMENTS

| | | | |
|---|---|---|---|
| 2016/0239327 A1 | 8/2016 | Kaplan et al. | |
| 2016/0357471 A1 | 12/2016 | Zevulun et al. | |
| 2017/0075622 A1* | 3/2017 | Kwon | G06F 3/0613 |
| 2017/0090753 A1* | 3/2017 | Benisty | G06F 3/061 |
| 2017/0126492 A1* | 5/2017 | Law | H04L 47/70 |
| 2017/0280349 A1 | 9/2017 | Ansley | |
| 2017/0010815 A1 | 10/2017 | Sprouse et al. | |
| 2018/0181302 A1* | 6/2018 | Liu | G06F 3/0688 |

OTHER PUBLICATIONS

C.-H. Hahm, S. Lee, T. Lee and S. Yoo, "Memory Access Scheduling for a Smart TV," in IEEE Transactions on Circuits and Systems for Video Technology, vol. 26, No. 2, pp. 399-411, Feb. 2016.*

X. Xie, D. Wei, Q. Li, Z. Song and L. Xiao, "CER-IOS: Internal Resource Utilization Optimized I/O Scheduling for Solid State Drives," 2015 IEEE 21st International Conference on Parallel and Distributed Systems (ICPADS), 2015, pp. 336-343.*

D. Gregorek, C. Osewold and A. Garcia-Ortiz, "A Scalable Hardware Implementation of a Best-Effort Scheduler for Multicore Processors," 2013 Euromicro Conference on Digital System Design, 2013, pp. 721-727.*

M. J. Raghunathan, V. B. Arjun, K. S. Kaushik and N. Ramasubramanian, "A novel scheduling algorithm for phase change memory based main memory system with multiple ranks," 2016 International Conference on Microelectronics, Computing and Communications (MicroCom), 2016, pp. 1-6.*

Y. Kang, Y.-s. Kee, E. L. Miller and C. Park, "Enabling cost-effective data processing with smart SSD," 2013 IEEE 29th Symposium on Mass Storage Systems and Technologies (MSST), 2013, pp. 1-12.*

Kang et al., "Enabling Cost-effective Data Processing with Smart SSD", 2013 IEEE 29th Symposium on Mass Storage Systems and Technologies (MSST), Long beach, CA, 2013, pp. 1-12.

* cited by examiner

SCHEDULING ACCESS COMMANDS FOR DATA STORAGE DEVICES

CROSS REFERENCE TO RELATED APPLICATION(S)

This application is a continuation application and claims priority to and the benefit of U.S. application Ser. No. 15/395,161, filed on Dec. 30, 2016, and entitled, "SCHEDULING ACCESS COMMANDS FOR DATA STORAGE DEVICES," the entire content of which is incorporated herein by reference.

BACKGROUND

Field

This disclosure relates to data storage systems. More particularly, the disclosure relates to systems and methods for managing input/output (I/O) traffic in a data storage device.

Description of Related Art

In data storage devices and systems, host and/or internal I/O activity can have a bearing on performance and/or other aspects of storage device operation.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to scheduling and/or executing access commands for a data storage device.

Overview

In data storage systems, such as solid-state memory systems, changes in a host input/output (I/O) traffic profile can present difficulties with respect to providing sufficiently prompt response to the host. The controller (or control circuitry) for the data storage device coupled to the host may generally use a static scheduling mechanism that to schedule the execution of access commands (e.g., read commands, write commands, etc.). For example, the static scheduling mechanism may not take into account the changes in the numbers and types of access commands received from the host over time. In addition, scheduling mechanisms generally do not take into account the layout of the non-volatile memory of the data storage device, as discussed in more detail below.

Certain embodiments disclosed herein provide for improved performance and/or efficiency in data storage systems and devices through the implementation of adaptive/dynamic scheduling based on input/output (I/O) statistics (such as pending access statistics and/or completed access statistics) and a layout of the non-volatile memory of a data storage device. Implementation of adaptive/dynamic scheduling (based on I/O statistics and the layout of the non-volatile memory) may provide a balance between access command throughput (e.g., the number of access commands that are executed over a period of time) and latency (e.g., the amount of time to execute an access command). In some embodiments, the adaptive scheduling may allow the data storage device/system to modify/adjust a schedule of access commands to compensate for changes in the quantity and types of access commands received from a host. For example, if a large number of write commands are received during a period of time, the adaptive scheduling may allow the data storage device/system to prevent the write commands from blocking read commands from executing during the period of time. The embodiments disclosed herein may also provide a self-learning mechanism that may allow the data storage device/system to analyze past access statistics to predict the types and quantities of access commands that may be received. Based on the predictions, the data storage devices/system may modify/adjust a schedule of access commands to prepare for and/or accommodate the predicted types/quantities of access commands.

Although certain embodiments are disclosed herein in the context of solid-state data storage devices and systems, it should be understood that certain features disclosed herein may be applicable devices/systems incorporating one or more other types of data storage, such as magnetic media, or other volatile or non-volatile memory. As used in this application, "non-volatile solid-state memory," "non-volatile memory," "NVM," or variations thereof may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Data Storage System

Figure 1:
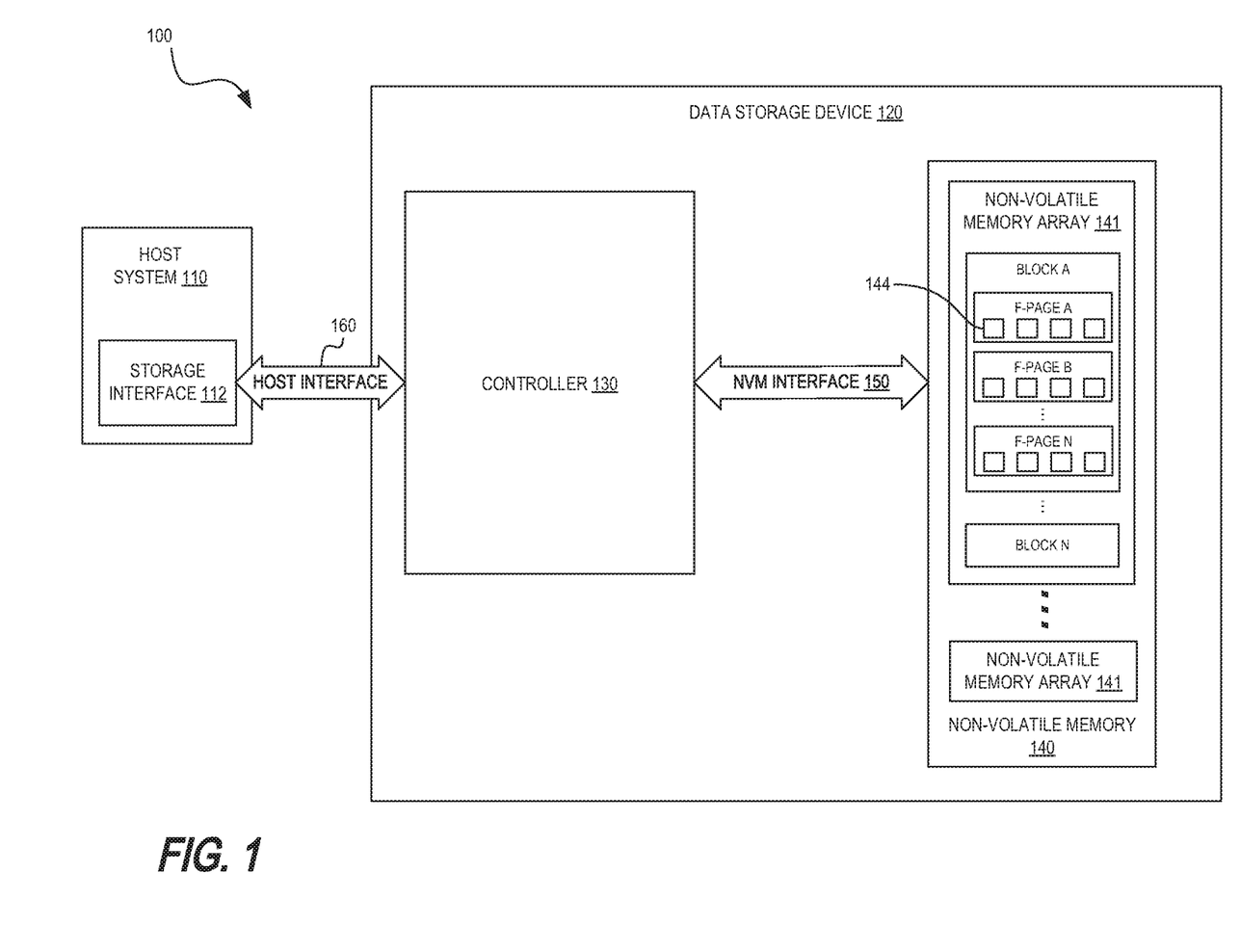
FIG. 1 is a diagram illustrating a data storage system, according to one or more embodiments of the present disclosure.

FIG. 1 is a block diagram illustrating a data storage system 100, according to one or more embodiments of the present disclosure. The data storage system 100 includes a host system 110 and a data storage device 120. The data storage device 120 may incorporate access command scheduling and/or execution in accordance with embodiments, examples, and/or implementations disclosed herein. The data storage device 120 may be any type of data storage device, module, component, system, or the like. Furthermore, the terms "drive" and "data storage drive" may be used herein in certain contexts to refer to any type of data storage device, and may be used substantially interchangeably with the term "data storage device" herein in connection with certain embodiments and/or in certain contexts. As shown, the data storage device 120 (e.g., hybrid hard drive, solid-state drive, any storage device utilizing solid-state memory, etc.) includes a controller 130 (e.g., control circuitry) and a non-volatile memory 140. The controller may receive data commands (from the host system 110) and may execute such commands in the non-volatile memory 140 (e.g., in one or more of the non-volatile memory arrays 141).

The controller 130 may comprise one or more processors, memory devices, data and/or power transmission channels/paths, boards, or the like. In certain embodiments, the controller 130 may be implemented as one or more system-on-a-chip (SoC) modules, field-programmable gate array (FPGA) modules, application-specific integrated circuit (ASIC) modules, processing devices (e.g., processors), chips, or the like. In certain embodiments, one or more components of the controller 130 may be mounted on a printed circuit board (PCB). The controller 130 may be configured to receive data commands from a storage interface 112 (e.g., a device driver) residing on the host system 110. The controller 130 may communicate with the host system 110 over a host interface 160, and may receive data storage access commands using the host interface 160. Data storage access commands may specify a block address in the data storage device 120; data may be accessed/transferred based on such commands.

The data storage device 120 can store data received from the host system 110 such that the data storage device 120 acts as data storage for the host system 110. To facilitate this function, the controller 130 can implement a logical interface. The logical interface can present to the host system memory as a set of logical addresses (e.g., sequential/contiguous addresses) where data can be stored. Internally, the controller 130 can map logical addresses to various physical memory addresses in the non-volatile memory arrays 141 and/or other memory module(s). Mapping data indicating the mapping of logical addresses to physical memory addresses may be maintained in the data storage device. For example, mapping table data may be stored in non-volatile memory array 141 in order to allow for recreation of mapping tables following a power cycle.

In some embodiments, each non-volatile memory array 141 may include one or more blocks of storage, identified as Block A through Block N. Each block may include a plurality of flash pages (F-pages). For example, Block A of FIG. 1 includes a plurality of F-pages, identified as F-pages A through N. In some embodiments, each F-page is a smallest grouping of memory cells in the non-volatile memory array 141 that can be programmed in a single operation or as a unit. Further, each F-page may include a plurality of code words, such as error-correcting pages (E-pages). In the illustrated embodiment, each F-page includes four E-pages that are illustrated as four boxes, including E-page 144. Other embodiments may use F-pages or E-pages that are defined differently or each F-page may include greater or fewer than four E-pages. In some embodiments, each non-volatile memory array 141 may be a die. For example, each non-volatile memory array 141 may be a flash memory die, a semiconductor die, a NAND die, etc.

In one embodiment, the NVM interface 150 may include a plurality of channels (e.g., one or more lines, pines, wires, traces, etc.) and each channel may be coupled to multiple non-volatile memory arrays 141, as discussed in more detail below. The number of non-volatile memory arrays 141 on a channel (e.g., the number of dies that share a channel) may vary between different data storage devices. For example, a first manufacturer of data storage devices may have four non-volatile memory arrays on a channel and a second manufacturer of data storage devices ma have eight non-volatile memory arrays on a channel. The number of channels and/or the number of non-volatile memory arrays that share a channel (e.g., that are on a same channel) may be referred to as a layout, a flash layout, a NAND layout, a geometry, a flash geometry, a NAND geometry, etc.

As discussed above, the controller 130 may receive access commands from the host system 110 via the host interface 160. Access commands may include read commands and write commands. For example, the commands may include a read command (e.g. a data read command) to read data from a page in a non-volatile memory array 141. The controller 130 may read the data from the page and may transmit the data to the host system 110 via the host interface 160. In another example, the commands may include a write command (e.g., a data write command) to write data to a page in a non-volatile memory array 141. In one embodiment, write commands may include program commands (e.g., a command to write the value "1" to a location a non-volatile memory array 141) and erase commands (e.g., a command to write the value "0" to a location in a non-volatile memory array 141). The controller 130 may receive the data from the host system 110 via the host interface 160 and may write the data to the page.

In addition, when the data storage device 120 is executing write commands (e.g., writing data received from the host to one or more pages in the non-volatile memory arrays 141), the data storage device may suffer from write amplification, where the amount of data that is written in response to a host write operation is greater than the actual amount of host data provided by the host to be written. For example, the excess amount of data written for a write operation may include data associated with one or more data maintenance/management operations, which may be required to provide sufficient free storage space to accommodate the host payload. Write amplification may therefore introduce additional read operations and additional write operations into the channel for the non-volatile memory array 141. For example, write amplification may cause the controller 130 to perform a read operation to read data from a first page and a write operation to move the data (read from the first page) to a second page, in order to free the first page to accommodate the host payload. The additional read operations and the additional write operations that occur with write amplification may be referred to as internal read operations and internal write operations, respectively. Write amplification may be particularly prevalent with respect to random host writes.

As the data storage device 120 receives access commands (e.g., read commands and/or write commands) from the host system 110, the controller 130 may schedule the access commands for execution. For example, the controller 130 may determine the order in which the access commands (received from the host system 110) are executed (e.g., may determine the execution order of the access commands). The types and quantities of access commands received by the controller 130 may vary over time. For example, the controller 130 the amount of read commands and the amount of write commands received by the controller may vary over time based on the activity of the host system 110. This variation in the in the types and quantity of access commands may affect the performance of the data storage device. For example, the amount of time to read data from a page in the non-volatile memory array may be increased when the amount of write commands increases. The amount of time to read data from a page and/or to transmit the data to the host system 110 may be referred to as read latency. In another example, the access command throughput of the data storage device 120 may decrease if there are a lot of internal read operations and/or internal write operations (e.g., which occur with write amplification). The access command throughput of the data storage device 120 may refer to the number of access commands that are executed during a period of time. In a further example, the power consumption of the data storage device 120 may increase. For example, read commands may cause the data storage device 120 to consume more power. A larger amount of read commands may cause the data storage device 120 to consume more power (e.g., may increase the power consumption of the data storage device 120). Internal read operations and/or internal write operations may further affect the read latency, access command throughput, and/or power consumption of the data storage device.

Certain solid-state storage devices can struggle to respond to changes in the types and quantities of access commands in a prompt or desirable fashion. For example, if the non-volatile memory arrays 141 are occupied with write operations (e.g., random write), host read operations can be effectively blocked, or slowed, for an undesirable amount of time where the controller 130 is not configured to update the scheduling of access commands. For example, if host read operations are blocked/slowed due to a large number of write commands and the execution of access commands is not rescheduled or modified, the host read operations may be block/slowed until the write commands are completed. Therefore, the full bandwidth of the NVM interface 150 and the non-volatile memory arrays 141 may not be available, resulting possibly in reduced performance.

In addition, certain data storage devices may not consider the layout of the non-volatile memory arrays 141 (e.g., the number of channels 205 and/or the number of non-volatile memory arrays 141 on each channel 205) when scheduling access instructions. If a data storage device does consider the layout of the non-volatile memory arrays, the scheduling mechanism used by the controller for the data storage device may be manually modified, updated, or tuned, to account for the different layouts of the non-volatile memory if the same controller is also used in other types of data storage devices (e.g., in other models of data storage devices). This may increase the complexity of manufacturing data storage devices because the scheduling mechanism for a controller is manually modified, update, or tuned for each model/type of data storage device that uses the controller.

In certain embodiments, the controller 130 may be configured to determine the layout of the non-volatile memory arrays 141, as discussed in more detail below. The controller 130 may also be configured to determine the pending access statistics and completed access statistics for a channel (e.g., for a set of non-volatile memory arrays 141 (e.g., dies) that share a channel). The pending access statistics, the completed access statistics, and the layout of the non-volatile memory modules may be used by the controller 130 to dynamically schedule and/or update (e.g., modify) the scheduling of pending access commands while the controller 130 is executing access commands (e.g., during run-time). Such scheduling functionality (e.g., dynamic or adaptive scheduling) may be leveraged to enhance operation of the data storage device with respect to performance, efficiency, and/or data storage maintenance. For example, the controller 130 may utilize scheduling functionality to improve the quality of service of the data storage device with respect to latency (e.g., read latency), access command throughput (e.g., number of commands executed during a period of time), power consumption, and/or other performance metrics, as discussed in more detail below.

In some embodiments, the adaptive scheduling may allow the data storage device/system to modify/adjust a schedule of access commands to compensate for changes in the workload (e.g., the quantity and types) of access commands received from a host. For example, if a large number of read commands are received during a period of time, the data storage device/system may consume more power because read commands may use more power. The adaptive scheduling may allow the data storage device/system to keep the power consumption of the data storage device below a threshold by scheduling other types of commands (e.g., write commands) in between the read commands. The embodiments disclosed herein may also provide a self-learning mechanism that may allow the data storage device/system to analyze past access statistics to predict patterns in the workload of access commands that are received and/or executed over periods of time. Based on the predictions, the data storage devices/system may modify/adjust a schedule of access commands to prepare for and/or accommodate the predicted workloads of access commands.

Data Storage Device

Figure 2:
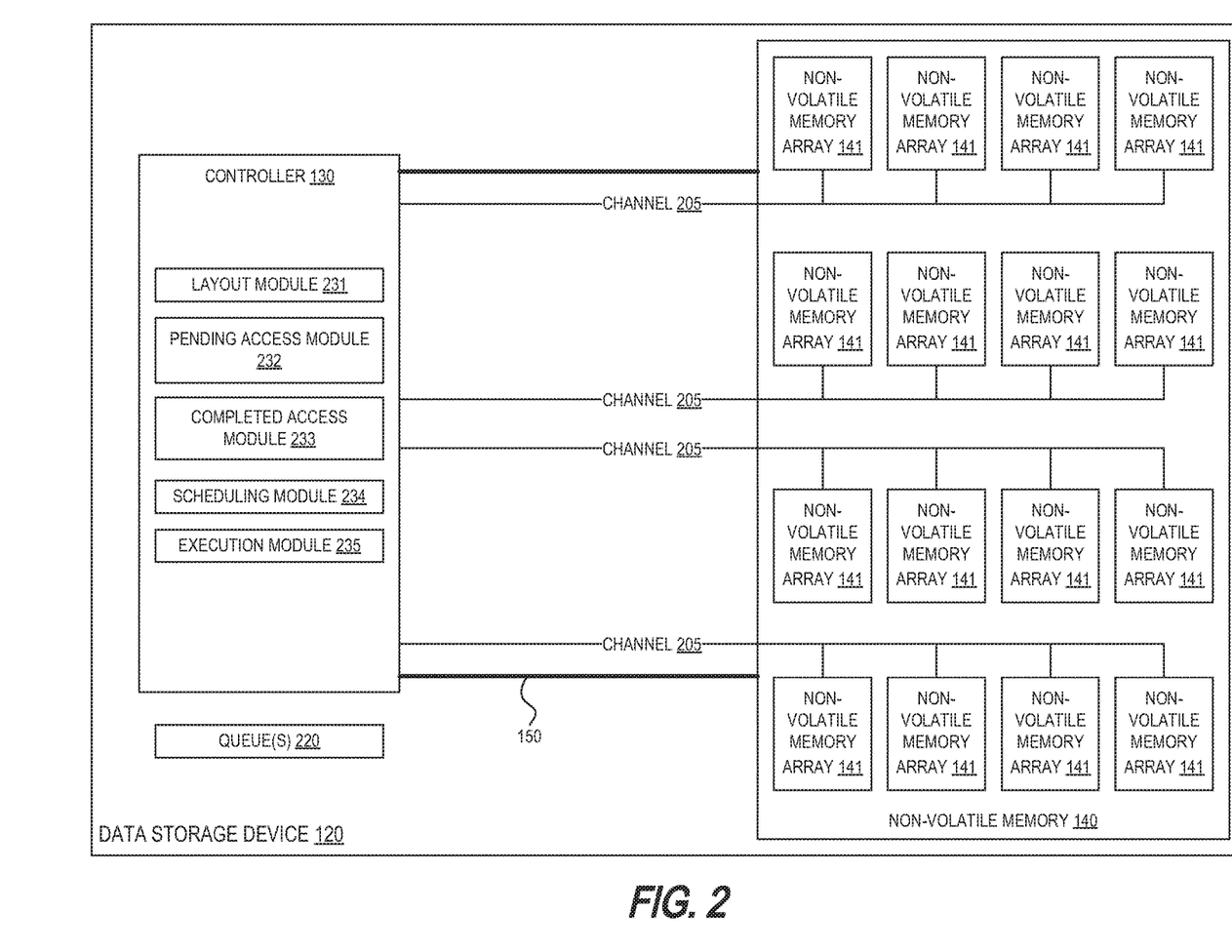
FIG. 2 is a diagram illustrating a data storage device, according to one or more embodiments of the present disclosure.

FIG. 2 is a diagram illustrating a data storage device 120, according to one or more embodiments of the present disclosure. The data storage device includes a controller 130, a NVM interface 150 and a non-volatile memory array 140, as discussed above. The controller 130 includes a layout module 231, a pending access module 232, a completed access module 233, a scheduling module 234, and an execution module 235. The non-volatile memory 140 includes a plurality of non-volatile memory arrays 141. As discussed above, each of the non-volatile memory arrays 141 may be a die (e.g., a flash memory die, a NAND die, etc.). Also as discussed above, the non-volatile memory arrays 141 (e.g., dies) may be divided into planes, blocks, pages, etc.

As illustrated in FIG. 2, the controller 130 is coupled to the non-volatile memory 140 via the NVM interface 150. The NVM interface 150 includes a plurality of channels 205. Each of the plurality of channels is coupled to a set of non-volatile memory arrays 141 (e.g., to a set of dies). Thus, the set of non-volatile memory arrays 141 may share a channel 205. For example, the top most four non-volatile memory arrays 141 share the top most channel 205. Each of the plurality of channels may include one or more data lines, pins, traces, wires, etc., that may be used to communicate information between the controller 130 and the non-volatile memory 140. In one embodiment, the controller 130 may be able to simultaneously execute one access command on each of the non-volatile memory arrays 141 (e.g., all dies) on the same channel 205. For example, controller may be able to simultaneously execute four access commands for the top most four non-volatile memory arrays 141 (e.g., may execute four access commands in parallel).

As discussed above, the layout of the non-volatile memory 140 may differ between different types/models of data storage devices (e.g., there may be a different number of channels and a different number of non-volatile memory arrays 141 per channel). Generally, the scheduling mechanism used by data storage devices may not take into account the layout (e.g., the NAND layout, NAND geometry) of non-volatile memory. Even if the scheduling mechanism used by a data storage device does take into account the layout, the scheduling mechanism is manually modified, updated, or tuned, to account for the different layouts of the non-volatile memory.

In one embodiment, the layout module 231 may determine the layout of the non-volatile memory 140 and/or the non-volatile memory arrays 141. For example, the layout module 231 may determine the number of channels 205 in the NVM interface 150 (e.g., may determine that there are four channels 205). In another example, the layout module may determine the number of non-volatile memory arrays 141 (e.g., dies) that are on each channel (e.g., may determine that each channel 205 has four non-volatile memory arrays 141 that share the channel 205). The controller 130 may determine the layout of the non-volatile memory arrays 141 when the data storage device 120 is booted or when the controller 130 connects to the non-volatile memory 140 via NVM interface 150. The controller 130 may determine the layout of the non-volatile memory arrays 141 by transmitting a message, a request, etc., to the non-volatile memory 140 or by accessing data (e.g., a field, a parameter, a setting, etc., that may indicate the layout) stored in the data storage device 120. The layout module 231 may provide the layout of the non-volatile memory 140 and/or the non-volatile memory arrays 141 to the scheduling module 234. For example, the layout module 231 may transmit data indicating which non-volatile memory arrays 141 are on which channels 205, to the scheduling module 234. In one embodiment, the layout module 231 may automatically determine the layout of the non-volatile memory 140. For example, the layout module 231 may automatically determine the layout of the non-volatile memory 140 when the data storage device 120 begins/initiates operation (e.g., when the data storage device 120 boots).

In one embodiment, the non-volatile memory arrays 141 and/or the channels 205 may be associated with one or more queues 220. For example, each channel 205 may be associated with a queue 220. In another example, each non-volatile memory array 141 may be associated with a queue 220. The queues 220 may store access commands that are pending for a channel 205 and/or a non-volatile memory array 141 (e.g., read commands, write commands, internal read operations, internal write operations, etc., that have not yet been executed or have not completed execution). For example, a queue 220 may store pending access commands for all of the non-volatile memory arrays 141 that are on the same channel 205. In another example, a queue 220 may store pending access commands for one non-volatile memory array 141. Although FIG. 2 illustrates the one or more queues 220 as being separate from the controller 130 (e.g., stored in a memory that is separate from the controller 130), one having ordinary skill in the art understands that the queues 220 may be included in a memory of the controller 130 (e.g., cache, registers, etc.) in other embodiments.

In one embodiment, the pending access module 232 may determine pending access statistics (e.g., pending access statistics) for the non-volatile memory arrays and may provide the pending access statistics to the scheduling module 234, as discussed in more detail below. For example, the pending access module 232 may determine the number of read commands (e.g., read requests), that are pending for one or more non-volatile memory arrays 141. In one embodiment, the completed access module 233 may determine access statistics (e.g., completed access statistics) for the non-volatile memory arrays and may provide the completed access statistics to the scheduling module 234, as discussed in more detail below. For example, the completed access module 233 may determine the number of write commands (e.g., write requests), that were completed during a period of time for one or more non-volatile memory arrays 141. In one embodiment, the pending access module 232 may determine pending access statistics for each channel 205 and/or each set of non-volatile memory arrays 141 that share a channel 205.

In one embodiment, the scheduling module 234 may determine an execution order of pending access commands, as discussed in more detail below. For example the scheduling module 234 may generate a schedule (e.g., an ordered list) indicating the order in which pending access commands should be executed. In another example, the scheduling module 234 may update (e.g., modify, change) a scheduling by changing the order in which access commands should be executed. The execution module 235 may execute access commands based on a schedule (e.g., a queue, an execution order, etc.) generated and/or updated by the scheduling module 234, as discussed in more detail below.

The layout module 231, the pending access module 232, the completed access module 233, the scheduling module 234, and the execution module 235 may each provide means for implementing certain respective functionalities as described herein, where such means may comprise control circuitry (e.g., special purpose control circuitry) including one or more processors (e.g., special purpose processor(s)), memory devices, transmission paths, and other hardware, firmware, and/or software components, or combinations thereof, configured to implement the functionalities of the respective modules described herein.

Figure 3:
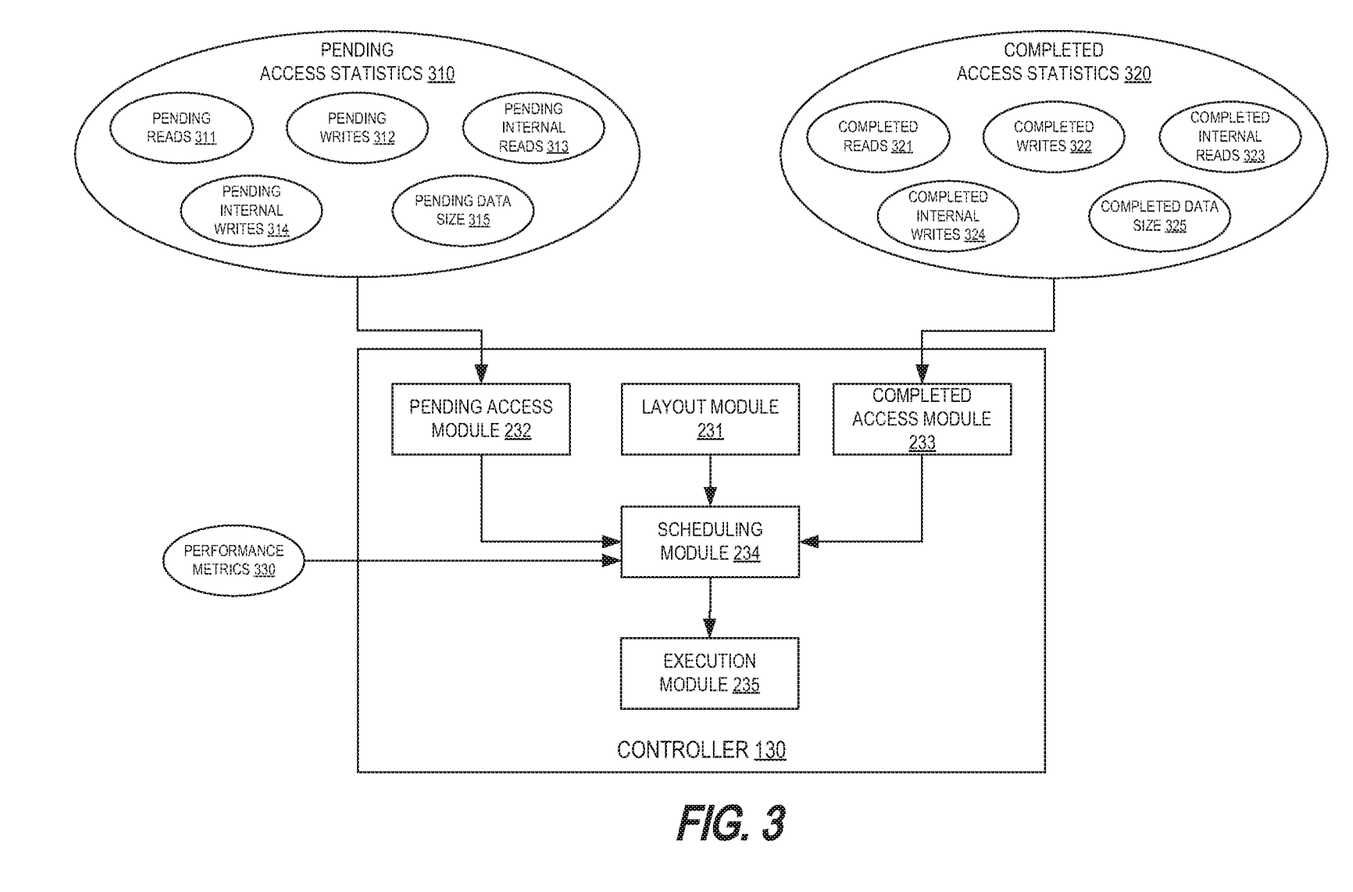
FIG. 3 is a diagram illustrating a controller according to one or more embodiments of the present disclosure.

FIG. 3 is a diagram illustrating a controller 130, according to one or more embodiments of the present disclosure. The controller 130 may be part of a data storage device or system, such as the data storage device 120 of FIG. 1. The controller 130 includes a layout module 231, a pending access module 232, a completed access module 233, a scheduling module 234, and an execution module 235, as discussed above. The controller 130 may be coupled to a non-volatile memory via a communication interface, such as a NVM interface (e.g., NVM interface 150 illustrated in FIGS. 1 and 2), as discussed above. The non-volatile memory may include a plurality of non-volatile memory arrays (e.g., dies, NAND dies, etc.) and the communication interface may include a plurality of channels, as discussed above. Each channel may be coupled to a set of non-volatile memory arrays (e.g., multiple non-volatile memory arrays may share a channel), as discussed above. The layout module 231 may determine the layout of the non-volatile memory (and/or non-volatile memory arrays) and may transmit data indicating the layout to the scheduling module 234, as discussed above.

As discussed above, the pending access module 232 may determine (e.g., collect, obtain, measure, gather, etc.) pending access statistics 310 for the non-volatile memory and/or non-volatile memory arrays and may provide the pending access statistics 310 to the scheduling module 234. In one embodiment, the pending access module 232 may determine pending access statistics 310 for each channel in the communication interface. For example, the pending access module 232 may determine pending access statistics 310 for a set of non-volatile memory arrays (e.g., dies) that share a channel. In other examples, the pending access module 232 may determine pending access statistics 310 for each set of non-volatile memory arrays (e.g., may determine multiple pending access statistics 310, one for each set of non-volatile memory arrays).

Pending access statistics 310 may include pending reads 311, pending writes 312, pending internal reads 313, pending internal writes 314, and pending data size 315. Pending reads 311 may be the number of read commands that are pending (e.g., are awaiting execution) for a set of non-volatile memory arrays and/or a channel. Pending writes 312 may be a number of write commands that are pending for a set of non-volatile memory arrays and/or a channel. Pending internal reads 313 may be the number of internal reads (e.g., read operations that occur when write amplification occurs) that are pending for a set of non-volatile memory arrays and/or a channel. Pending internal writes 314 may be the number of internal writes (e.g., writes operation that occur when write amplification occurs) that are pending for a set of non-volatile memory arrays and/or a channel. The pending data size 315 may be the size/amount of data (e.g., bits, bytes, kilobytes (KB), megabytes (MB), etc.) that is waiting to be written to the non-volatile memory and/or read from the non-volatile memory. As discussed above, each non-volatile memory array may be associated with a queue or each channel may be associated with a queue. The pending access commands for a non-volatile memory array or a channel may be stored in a respective queue. In one embodiment, the pending access module 232 may analyze one or queues to determine the pending access statistics 310. In another embodiment, the pending access statistics 310 may include instructions that are currently executing (e.g., instructions that have not yet completed but are currently executing).

As discussed above, the completed access module 233 may determine (e.g., collect, obtain, measure, gather, etc.) completed access statistics 320 for the non-volatile memory and/or non-volatile memory arrays and may provide the completed access statistics 320 to the scheduling module 234. In one embodiment, the completed access module 232 may determine completed access statistics 320 for each channel in the communication interface. For example, the completed access module 233 may determine completed access statistics 320 for each set of non-volatile memory arrays (e.g., may determine multiple completed access statistics 320, one for each set of non-volatile memory arrays).

Completed access statistics 320 may include completed reads 321, completed writes 322, completed internal reads 323, completed internal writes 324, and completed write size 325. Completed reads 321 may be the number of read commands that were completed (e.g., performed, executed, etc.) during a period of time (e.g., a monitoring period) for a set of non-volatile memory arrays and/or a channel. Completed writes 322 may be a number of write commands that were completed during a period of time for a set of non-volatile memory arrays and/or a channel. Completed internal reads 323 may be the number of internal reads (e.g., read operations that occur when write amplification occurs) that were completed during a period of time for a set of non-volatile memory arrays and/or a channel. Completed internal writes 324 may be the number of internal writes (e.g., write operations that occur when write amplification occurs) that were completed during a period of time for a set of non-volatile memory arrays and/or a channel. The completed data size 315 may be the size/amount of data (e.g., bits, bytes, kilobytes (KB), megabytes (MB), etc.) that was written to the non-volatile memory and/or read from the non-volatile memory during a period of time.

In one embodiment, the completed access statistics 320 may be periodically determined by the completed access module 233 for sets of non-volatile memory arrays and/or channels. For example, the completed access module 233 may obtain, gather, collect, etc., the completed access statistics 320 for monitoring period (e.g., may collect the completed access statistics 320 for 100 milliseconds (ms) of time). One having ordinary skill in the art understands that various monitoring periods (e.g., various amount of time) may be used in other embodiments. In certain embodiments, the completed access statistics may be collected according to a storage device operational process for various purposes. In one embodiment, the completed access statistics 320 may be reset after a period of time and recounted/collected. For example, every 100 ms, the completed access statistics 320 may be reset. In another embodiment, historical completed access statistics may be maintained in the data storage device. For example, multiple sets of completed access statistics 320 may be stored in the data storage device, where each set of completed access statistics 320 is for a different 100 ms period. In a further embodiment, the completed access module 233 may receive the completed access statistics 320 from a separate module or device.

In one embodiment, the scheduling module 234 may determine an execution order of pending access commands. For example the scheduling module 234 may generate a schedule (e.g., an ordered list) indicating the order in which pending access commands should be executed. In another example, the scheduling module 234 may modify a schedule (e.g., may modify an execution order of pending access commands), as discussed in more detail below. For example, the scheduling module 234 may pause an executing write command and may schedule a pending read command to be executed first. The scheduling module 234 may also use a queue (not shown in FIG. 2) when generating and/or updating a scheduled. For example, the scheduling module 234 may insert commands into the queue, may rearrange the order of commands in the queue, etc. The queue may be used by the execution module 235 to execute access commands.

As discussed above, the scheduling module 234 may determine a schedule (e.g., an execution order of pending access commands) based on one or more of the pending access statistics 310, the completed access statistics 320, and the layout of a non-volatile memory. For example, because multiple access commands may be executed simultaneously for the non-volatile memory arrays (e.g., dies) that share a channel, the scheduling module 234 may use the pending access statistics 310 to determine the access commands that are being on each non-volatile memory array in a set of non-volatile memory arrays (that share a channel). This may allow the scheduling module 234 to allocate different types of commands (e.g., read commands or write commands) for different non-volatile memory arrays that share a channel. For example, if three of the four non-volatile memory arrays on the channel are being used to write data, then using the fourth non-volatile memory array to read data may be useful in decreasing read latency. The scheduling module 234 may also use the completed access statistics 320 to estimate the types of access commands that may be received from a host system. For example, the scheduling module 234 may predict that the three read commands and four write commands will be received from the host system, based on past statistics of access commands received during a previous monitoring period. The scheduling module 234 may determine/adjust the schedule to allow bandwidth for the three predicted read commands.

In embodiment, the scheduling module 234 may also determine a schedule (e.g., create a schedule, update/modify a schedule, etc.) based on one or more performance metrics 330. In one embodiment, the performance metrics 330 may include power consumption. For example, the performance metrics 330 may indicated that power consumption for the data storage device should not exceed a threshold power consumption. Because different access commands may cause the data storage device to consume different amounts of power when the access commands are executed, the scheduling module 234 may determine a schedule of access commands that may allow the amount of power consumed (e.g., used) by data storage device to remain below the threshold power consumption (e.g., below the threshold power level). In another embodiment, the scheduling module 234 may generate and/or update a schedule by modifying a queue associated with a channel and/or a set of non-volatile memory arrays. For example, the scheduling module 234 may change the order of access commands (e.g., pending access commands) in a queue for a channel/set of non-volatile memory arrays. The scheduling module 234 may change the order of the access commands in the queue by moving one or more access commands to different positions in the queue. In one embodiment, the scheduling module 234 may generate a schedule for each set of non-volatile memory arrays and/or for each channel.

In another embodiment, the performance metrics 330 may include read latency. For example, the performance metrics 330 may indicate that the read latency (e.g., the amount of time it takes to read data from the non-volatile memory) should not exceed a threshold time. If there are too many write commands currently executing and there are pending read commands, the scheduling module 234 may generate and/or update a schedule to allow the pending read commands to execute first/earlier.

In a further embodiment, the performance metrics 330 may include an access command throughput. For example, the performance metrics 330 may indicate a minimum number of access commands that should be completed during a period of time. The scheduling module 234 may generate and/or update a schedule to allow the more pending commands to be executed during a period of time. For example, commands that may execute faster (e.g., access commands that read and/or write smaller amounts of data, access commands that cause fewer internal read/write operations, etc.) may be scheduled to execute first to increase the access command throughput.

In some embodiments, the performance metrics 330 may be changed and/or updated. For example, the performance metrics 330 may initially indicate that read latency should be reduced. After a period of time, the performance metrics 330 may be changed to indicate that the access command throughput should be increased. Changes to the performance metrics may be received from the scheduling module 234 when the scheduling module attempts to balance the performance of the data storage device 120 with respect to the various performance metrics. For example, if one performance metric 330 is met (e.g., read latency is met), the scheduling module 234 may generate and/or update schedules in order to meet a second performance metric 330 (e.g., power consumption or access command throughput).

The execution module 235 may execute access commands based on a schedule (e.g., a queue, an execution order, etc.) generated by the scheduling module 234, as discussed in more detail below. For example, the execution module 235 may execute commands that are inserted into a queue. In some embodiments, the queue may be representative of a schedule for a channel 205 and/or a non-volatile memory array 141. In one embodiment, the execution module 235 may include multiple cores or processing cores. For example, the controller 130 may be a multi-core processor. Each core may execute access commands according to a schedule for a respective channel 205 and/or set of non-volatile memory arrays 141.

In one embodiment, the operation of the controller 130 (e.g., the layout module 231, the pending access module 232, the completed access module 233, the scheduling module 234, and the execution module 235) may advantageously allow the data storage device 120 to update the schedule of access commands in order to compensate for changes in the quantity and types of access commands received from a host. For example, when the host system starts to send a large number of write commands, the controller 130 may adjust the schedule such that read commands are not blocked by the write commands for too long a time. In another example, the schedule of access commands may also be updated to meet various performance criteria/metrics for the data storage device (e.g., may be updated to keep power consumption below a threshold).

Figure 4:
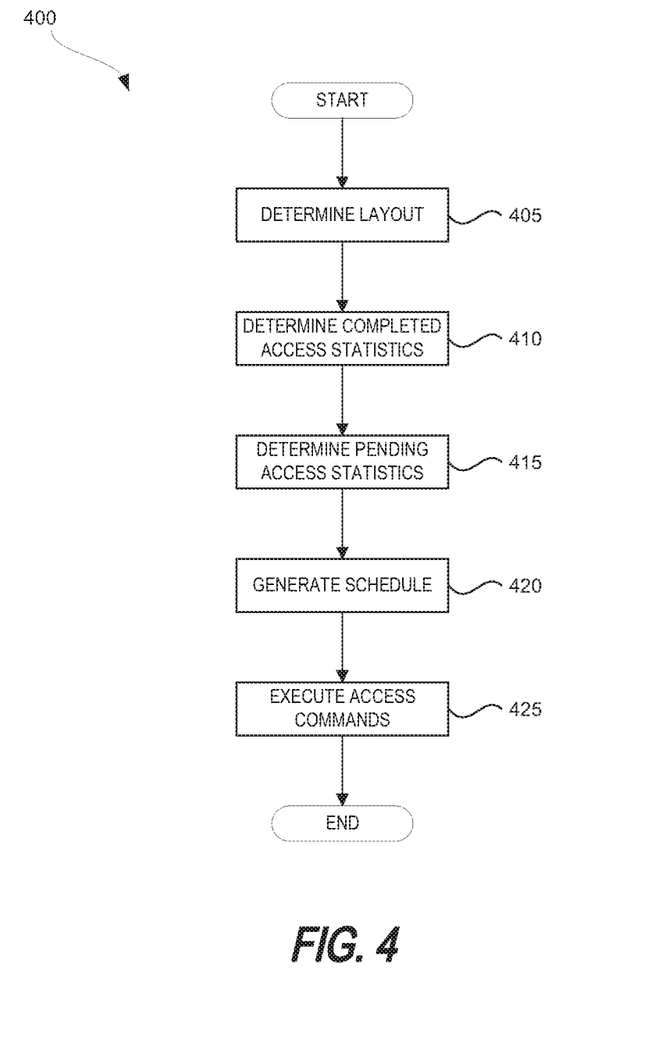
FIG. 4 is a flow diagram illustrating a process for scheduling access commands, according to one or more embodiments of the present disclosure.

FIG. 4 is a flow diagram illustrating a process 400 for executing access commands, according to one or more embodiments of the present disclosure. The process 400 may be performed by a controller, modules of a controller (e.g., the modules illustrated in FIGS. 2 and 3), a processing device (e.g., a processor, a central processing unit (CPU)), and/or a data storage device. The controller, processing device, and/or data storage device may be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process 400 determines a layout of a non-volatile memory of a data storage, as discussed above. For example, the process 400 may determine the number of channels in a communication interface (e.g., a NVM interface) and/or may determine the number of non-volatile memory arrays (e.g., dies) coupled to each interface, as discussed above. At block 410, the process 400 may determine completed access statistics for the data storage device, as discussed above. In one embodiment, the process 400 may determine the completed access statistics for each channel and/or each set of non-volatile memory arrays that share a channel. For example, the process may determine one or more of: the number of completed read commands during a period of time, the number of completed write commands during the period of time, the number of completed internal read operations during the period of time, the number of completed internal write operations during the period of time, and an amount (e.g., size) of data that was written/read from the data storage device during the period of time.

The process 400 may determine pending access statistics at block 415, as discussed above. In one embodiment, the process 400 may determine the pending access statistics for each channel and/or each set of non-volatile memory arrays that share a channel. For example, the process 400 may determine one or more of: the number of pending read commands, the number of pending write commands, the number of pending internal read operations, the number of pending internal write operations, and an amount (e.g., size) of data that is waiting to be written to and/or read from the set of non-volatile memory arrays.

At block 420, the process 400 may generate a schedule (e.g., determine an execution order of access commands), as discussed above. The process 400 may also update/modify the schedule at block 420, as discussed above. The process 400 may generate and/or update the schedule based on pending access statistics, completed access statistics, and/or performance metrics/criteria (e.g., power consumption, read latency, access command throughput), as discussed above. In one embodiment, the process 400 may generate a schedule for each set of non-volatile memory arrays and/or channel. At block 425, the process 400 may execute access commands based on the schedule, as discussed above. For example, the process 400 may execute pending access commands for a set of non-volatile memory arrays and/or a channel based on the schedule.

Figure 5:
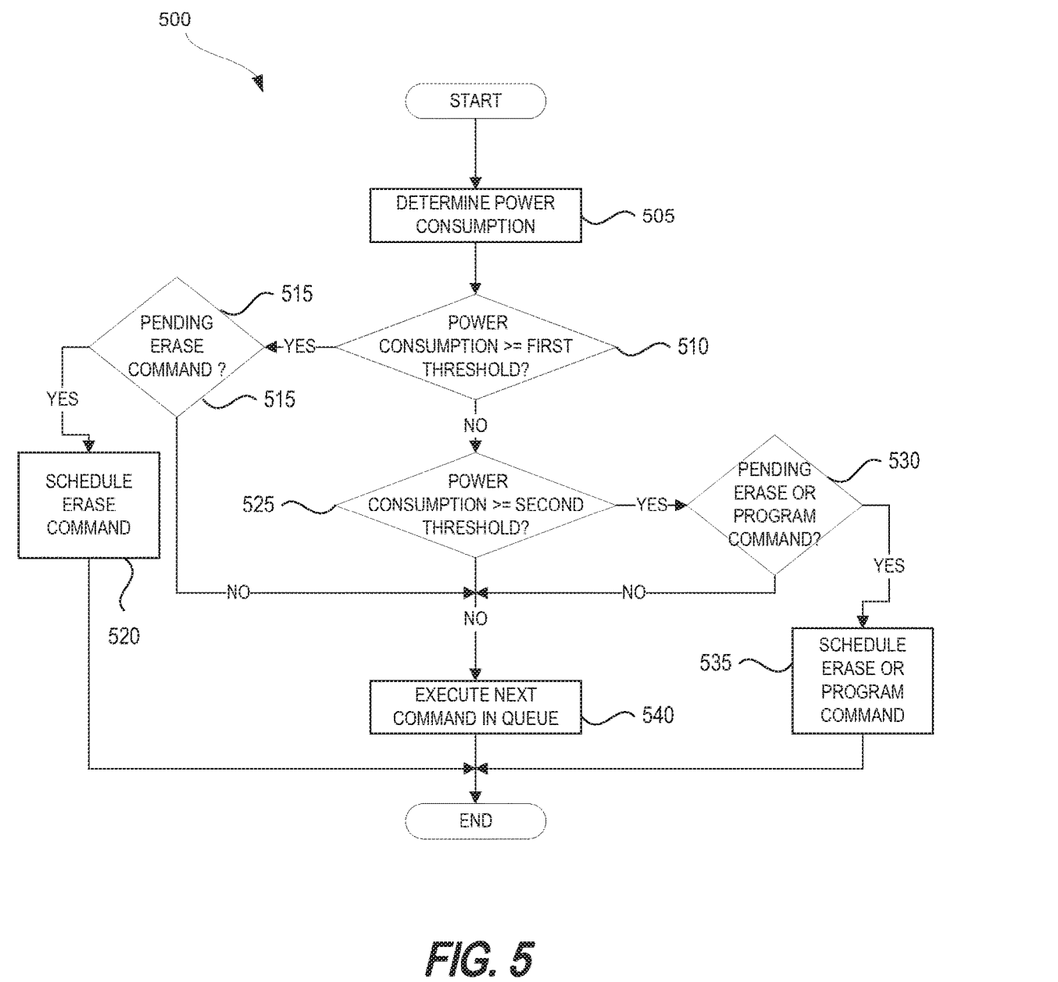
FIG. 5 is a flow diagram illustrating a process for scheduling access commands, according to one or more embodiments of the present disclosure.

FIG. 5 is a flow diagram illustrating a process 500 for scheduling access commands, according to one or more embodiments of the present disclosure. The process 500 may be performed by a controller, modules of a controller (e.g., the modules illustrated in FIGS. 2 and 3), a processing device (e.g., a processor, a central processing unit (CPU)), and/or a data storage device. The controller, processing device, and/or data storage device may be processing logic that includes hardware (e.g., circuitry, dedicated logic, programmable logic, microcode, etc.), software (e.g., instructions run on a processor to perform hardware simulation), firmware, or a combination thereof.

In one embodiment, the process 500 may illustrate how access commands may be scheduled based on a performance metric/criteria such as power consumption. In the example illustrated in FIG. 5, a read command may consume the most amount of power, followed by a program command (e.g., a type of write command), and followed by an erase command (e.g., another type of write command). In addition, the first threshold (e.g., a first amount of power consumption) may be larger/greater than the second threshold (e.g., a second amount of power consumption).

The process 500 begins at block 505 where the process 500 determines the power consumption of the data storage device. At block 510, the process 500 determine whether the power consumption is greater than or equal to a first threshold power consumption. If the power consumption is greater than or equal to the first threshold power consumption, the process 500 may determine whether there is a pending erase command (e.g., a pending write command) at block 515. For example, the process 500 may analyze a queue to determine whether there is a pending erase command in the queue. If there is a pending erase command, the process 500 may schedule the pending erase command to be executed next, at block 520. For example, the process 500 may move the pending erase command to the top of the queue (e.g., to an earlier or higher position in the queue). If there is no pending erase command, the process 500 may execute the next command in the queue at block 540.

If the power consumption is not greater than or equal to the first threshold, the process 500 may determine whether the power consumption is greater than or equal to a second threshold at block 525. If the power consumption is greater than or equal to the second threshold, the process 500 determines whether there is a pending erase command or a pending program command in the queue at block 530. If there is a pending erase command or a pending program command in the queue, the process 500 may schedule the pending erase command or the pending program command to be executed next, at block 535. For example, the process 500 may move the pending erase command or the pending program command to the front of the queue. If there is no pending erase command and no pending program command, the process 500 may execute the next command in the queue at block 540.

Figure 6:
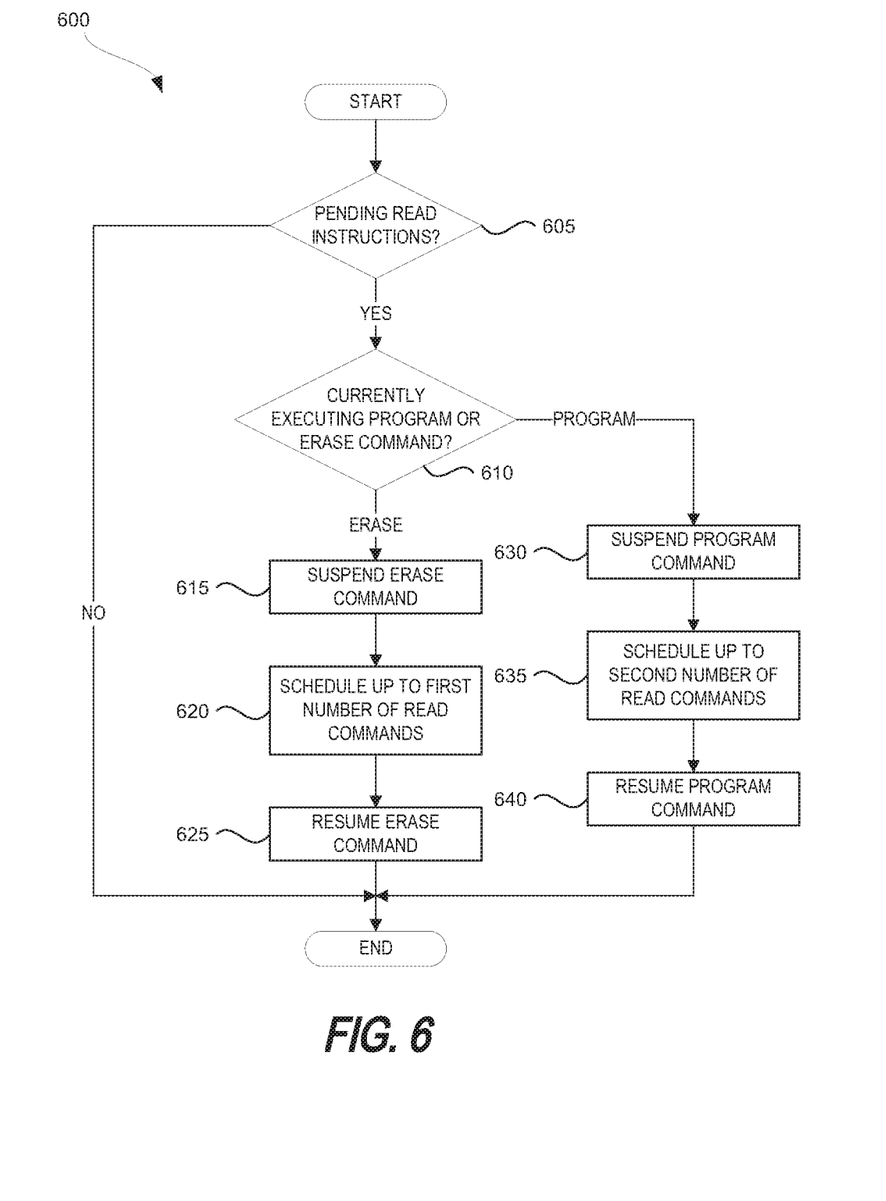
FIG. 6 is a flow diagram illustrating a process for scheduling access commands, according to one or more embodiments of the present disclosure.

FIG. 6 is a flow diagram illustrating a process 600 for scheduling access commands, according to one or more embodiments of the present disclosure. The process 600 may be performed by a controller, modules of a controller (e.g., the modules illustrated in FIGS. 2 and 3), a processing device (e.g., a processor, a central processing unit (CPU)), and/or a data storage device. The controller, processing device, and/or data storage device may be processing logic that includes hardware (e.g., circuitry, dedicated logic, programmable logic, microcode, etc.), software (e.g., instructions run on a processor to perform hardware simulation), firmware, or a combination thereof.

In one embodiment, the process 600 may be performed for a non-volatile memory array (e.g., a die) in a set of non-volatile memory arrays. The non-volatile memory array may be associated with a queue of pending access commands to be executed on the non-volatile memory array, as discussed above. In addition, the process 600 may analyze and/or use completed access statistics to schedule the access commands.

The process 600 begins at block 605 where the process 600 determines whether there are pending read commands for the non-volatile memory array. For example, the process 600 may analyze the queue to determine if the queue includes pending read commands. If the queue does not include pending read commands, the process 600 ends. If the queue does include pending read commands, the process 600 determines whether the access command that is currently executing for the non-volatile memory array is a program command or an erase command at block 510.

If the currently executing command is an erase command, the process 600 suspends the execution of the erase command at block 615. At block 620, the process 600 may schedule up to a first number of read commands. For example, if the first number is ten, the process 600 may analyze the queue and may identify up to the first ten read commands in the queue. The process 600 may schedule the ten read commands to be executed next. For example, the process may move up to ten read commands to the front of the queue. After the read commands have been executed, the process 600 may resume execution of the erase command at block 625.

If the currently executing command is a program command, the process 600 suspends the execution of the program command at block 615. At block 620, the process 600 may schedule up to a second number of read commands. For example, if the second number is five, the process 600 may analyze the queue and may identify up to the first five read commands in the queue. The process 600 may schedule the read commands to be executed next. For example, the process may move up to five read commands to the front of the queue. After the read commands have been executed, the process 600 may resume execution of the program command at block 625.

In one embodiment, the first number may be based on the number of read commands that were completed per erase command during a previous monitoring period. For example, completed access statistics may be analyzed to determine that ten read commands that were completed per erase command that was completed, during the previous monitoring period. In another embodiment, the second number may be based on the number of read commands that were completed per program command during a previous monitoring period. For example, completed access statistics may be analyze to determine that five read commands that were completed per program command that was completed, during the previous monitoring period. In a further embodiment, the process 600 may reduce the read latency experienced by a host system coupled to the data storage device. For example, the process 600 may allow read commands to be scheduled/rescheduled for execution first.

Figure 7:
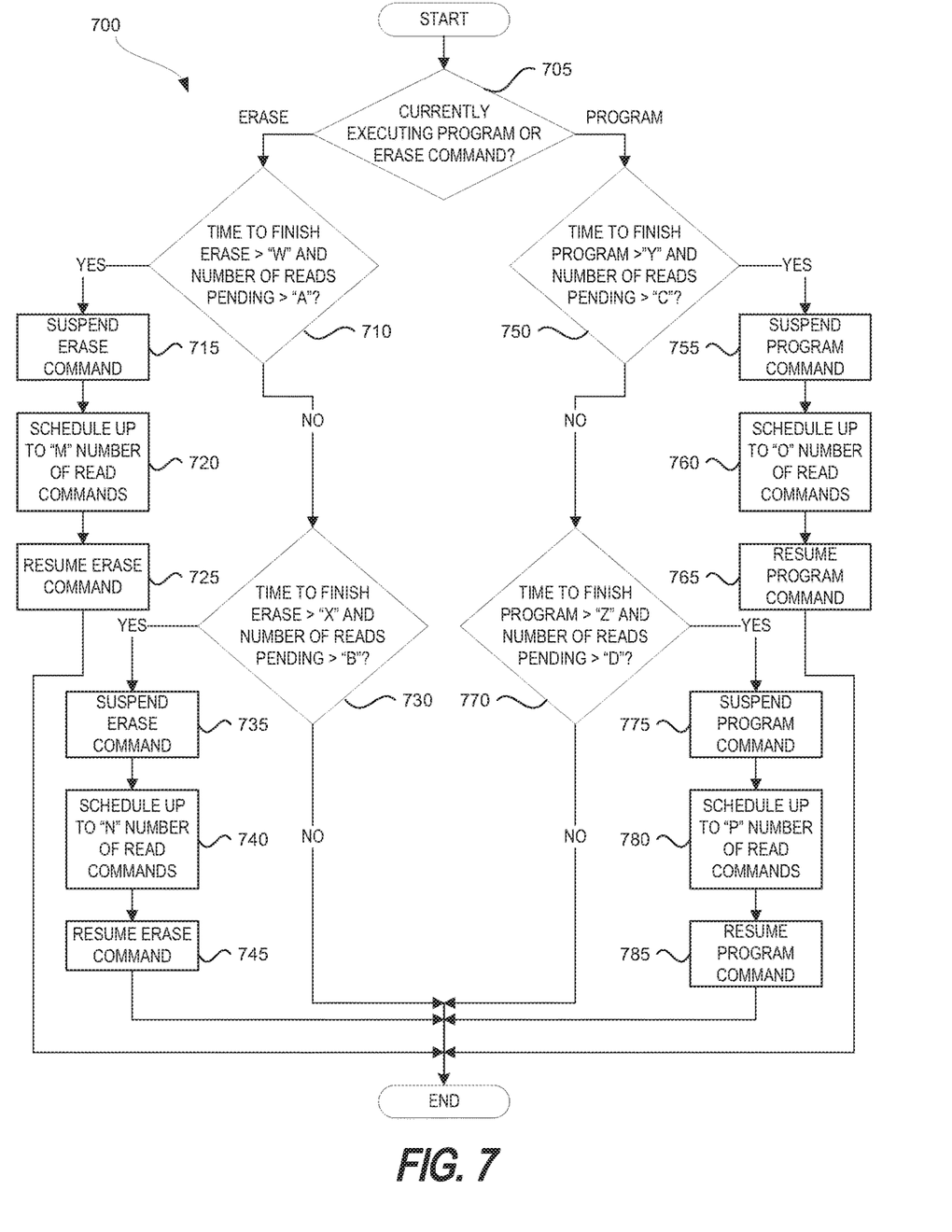
FIG. 7 is a flow diagram illustrating a process for scheduling access commands, according to one or more embodiments of the present disclosure.

FIG. 7 is a flow diagram illustrating a process 700 for scheduling access commands, according to one or more embodiments of the present disclosure. The process 700 may be performed by a controller, modules of a controller (e.g., the modules illustrated in FIGS. 2 and 3), a processing device (e.g., a processor, a central processing unit (CPU)), and/or a data storage device. The controller, processing device, and/or data storage device may be processing logic that includes hardware (e.g., circuitry, dedicated logic, programmable logic, microcode, etc.), software (e.g., instructions run on a processor to perform hardware simulation), firmware, or a combination thereof.

In the example illustrated in FIG. 7, "M" may represent the number of read commands completed per erase command during a monitoring period, "N" may represent the number of read commands completed each time an erase command is suspended, "O" may represent the number of read commands completed per program command during a monitoring period, and "P may represent the number of read commands completed each time a program command is suspended. "M" may greater than "N" and "O" may be greater than "P." "A" may be greater than or equal to "M," B may be greater than or equal to "N," "C may be greater than or equal to "O," and D may be greater than or equal to "P." "W" is greater than "X" and "Y" is greater than "Z."

The process 700 begins at block 705 where the process 700 determines whether the currently executing access command is a program command (e.g., a type of write command) or an erase command (e.g., a type of write command). If the currently executing command is an erase command, the process determines whether the time to finish execution of the erase command is greater than "W" and the number of pending read commands is greater than "A" at block 710. If so, the process 700 proceeds to block 715 where the process 700 suspends the currently executing erase command. At block 720, the process 700 schedules up to the first "M" pending read commands. After the read commands have been executed, the process 700 may resume the erase command at block 725. If not, the process 700 proceeds to block 730 where the process 700 determines whether the time to finish execution of the erase command is greater than "X" and the number of pending read commands is greater than "B." If not, the process 700 ends. If so, the process 700 proceeds to block 735 where the process 700 suspends the currently executing erase command. At block 740, the process 700 schedules up to the first "N" pending read commands. After the read commands have been executed, the process 700 may resume the erase command at block 745.

If the currently executing command is a program command, the process 700 determines whether the time to finish execution of the program command is greater than "Y" and the number of pending read commands is greater than "C" at block 750. If so, the process 700 proceeds to block 755 where the process 700 suspends the currently executing program command. At block 760, the process 700 schedules up to the first "O" pending read commands. After the read commands have been executed, the process 700 may resume the program command at block 765. If not, the process 700 proceeds to block 770 where the process 700 determines whether the time to finish execution of the program command is greater than "Z" and the number of pending read commands is greater than "D." If not, the process 700 ends. If so, the process 700 proceeds to block 775 where the process 700 suspends the currently executing program command. At block 780, the process 700 schedules up to the first "P" pending read commands. After the read commands have been executed, the process 700 may resume the program command at block 785.

General Comments

Those skilled in the art will appreciate that in some embodiments, other types of computing devices and/or memories may be implemented while remaining within the scope of the present disclosure. In addition, the actual steps taken in the processes discussed herein may differ from those described or shown in the figures. Depending on the embodiment, certain of the steps described above may be removed, others may be added, and/or reordered.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
a plurality of non-volatile memory arrays; and
a controller coupled to the plurality of non-volatile memory arrays via a plurality of channels, the controller configured to:
   determine a physical layout of the plurality of non-volatile memory arrays, wherein the physical layout indicates which of the plurality of non-volatile memory arrays is coupled to which of the plurality of channels;
   determine completed access statistics for a first set of the plurality of non-volatile memory arrays during a monitoring period;
   determine pending access statistics for the first set of the plurality of non-volatile memory arrays;
   generate a schedule based on the physical layout of the plurality of non-volatile memory arrays, the completed access statistics, and the pending access statistics; and
   execute, based on the schedule, access commands using the plurality of non-volatile memory arrays,
   wherein the schedule comprises an ordered list indicating an order in which access commands are to be executed, the order being based on the physical layout of the plurality of non-volatile memory arrays, the completed access statistics, and the pending access statistics.

2. The data storage device of claim 1, wherein the controller is configured to perform at least one of:
   determine the completed access statistics by determining a number of write commands that were completed during the monitoring period;
   determine the completed access statistics by determining a number of read commands that were completed during the monitoring period;
   determine the completed access statistics by determining a number of internal read operations that were completed during the monitoring period; or
   determine the completed access statistics by determining a number of internal write operations that were completed during the monitoring period.

3. The data storage device of claim 1, wherein the controller is configured to generate the schedule further based on a threshold power consumption for the data storage device.

4. The data storage device of claim 1, wherein the controller is configured to generate the schedule further based on a threshold read latency.

5. The data storage device of claim 1, wherein the controller is configured to generate the schedule further based on an access command throughput.

6. The data storage device of claim 1, wherein the controller is configured to determine the physical layout by being further configured to determine a total number of the plurality of channels.

7. The data storage device of claim 6, wherein the controller is configured to determine the physical layout by being further configured to determine, for each of the plurality of channels, which of the plurality of non-volatile memory arrays is coupled with a respective channel of the plurality of channels.

8. The data storage device of claim 1, wherein the controller is configured to generate the schedule by being further configured to generate a schedule for at least one of the plurality of channels.

9. A data storage device comprising:
a plurality of non-volatile memory arrays;
means for determining a physical layout of the plurality of non-volatile memory arrays, wherein the plurality of non-volatile memory arrays is coupled to a controller via a plurality of channels, wherein the physical layout indicates which of the plurality of non-volatile memory arrays is coupled to which of the plurality of channels;
means for determining completed access statistics for a first set of the plurality of non-volatile memory arrays during a monitoring period;
means for determining pending access statistics for the first set of the plurality of non-volatile memory arrays;
means for generating a schedule based on the physical layout of the plurality of non-volatile memory arrays, the completed access statistics, and the pending access statistics; and
means for executing, based on the schedule, access commands using the plurality of non-volatile memory arrays,
wherein the schedule comprises an ordered list indicating an order in which access commands are to be executed, the order being based on the physical layout of the plurality of non-volatile memory arrays, the completed access statistics, and the pending access statistics.

10. The data storage device of claim 9, wherein the means for determining the physical layout of the non-volatile memory arrays comprises means for determining that each non-volatile memory array in the first set of the plurality of non-volatile memory arrays is coupled to a first channel.

11. The data storage device of claim 10, wherein the means for determining the completed access statistics comprises means for determining at least one of:
   a number of write commands that were performed during the monitoring period;
   a number of read commands that were performed during the monitoring period;
   a number of internal read operations that were performed during the monitoring period; or
   a number of internal write operations that were performed during the monitoring period.

12. The data storage device of claim 11, wherein the means for determining pending access statistics comprises means for determining at least one of:
   a number of the pending read commands for the first set of the plurality of non-volatile memory arrays;
   a number of the pending write commands for the first set of the plurality of non-volatile memory arrays;
   a number of the pending internal read operations for the first set of the plurality of non-volatile memory arrays; or
   a number of the pending internal write operations for the first set of the plurality of non-volatile memory arrays.

13. The data storage device of claim 12, wherein the means for generating the schedule is further based on at least one of:
- a threshold power consumption for the data storage device;
- a threshold read latency; or
- and access command throughput.

14. A method comprising:
- determining a physical layout of a plurality of dies of a data storage device, wherein the plurality of dies is coupled to a controller via a plurality of channels, wherein the physical layout indicates which of the plurality of dies is coupled to which of the plurality of channels;
- determining completed access statistics for a first set of the plurality of dies during a monitoring period;
- determining pending access statistics for the first set of the plurality of dies;
- generating a schedule based on the physical layout of the plurality of dies, the completed access statistics, and the pending access statistics; and
- executing, based on the schedule, access commands using the plurality of dies,
- wherein the schedule comprises an ordered list indicating an order in which access commands are to be executed, the order based on the physical layout of the plurality of dies, the completed access statistics, and the pending access statistics.

15. The method of claim 14, wherein determining the physical layout of the dies comprises determining that each die in the first set of the plurality of dies is coupled to a first channel.

16. The method of claim 15, wherein determining the completed access statistics comprises determining at least one of:
- a number of write commands that were performed during the monitoring period;
- a number of read commands that were performed during the monitoring period;
- a number of internal read operations that were performed during the monitoring period; or
- a number of internal write operations that were performed during the monitoring period.

17. The method of claim 14, wherein the controller is configured to generate the schedule further based on at least one of:
- a threshold power consumption for the data storage device;
- a threshold read latency; or
- an access command throughput.

* * * * *